(12) United States Patent
Uno et al.

(10) Patent No.: US 8,792,686 B2
(45) Date of Patent: Jul. 29, 2014

(54) BIOMETRIC AUTHENTICATION DEVICE, METHOD OF CONTROLLING BIOMETRIC AUTHENTICATION DEVICE AND NON-TRANSITORY, COMPUTER READABLE STORAGE MEDIUM

(75) Inventors: Kazuya Uno, Kawasaki (JP); Yukihiro Abiko, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 187 days.

(21) Appl. No.: 13/310,133

(22) Filed: Dec. 2, 2011

(65) Prior Publication Data

US 2012/0189170 A1 Jul. 26, 2012

(30) Foreign Application Priority Data

Jan. 25, 2011 (JP) ................. 2011-013436

(51) Int. Cl.
*G06K 9/62* (2006.01)
(52) U.S. Cl.
USPC .......................................................... 382/124
(58) Field of Classification Search
None
See application file for complete search history.

(56) References Cited

U.S. PATENT DOCUMENTS

| | | | |
|---|---|---|---|
| 5,272,766 A | | 12/1993 | Higgins et al. |
| 5,999,637 A | * | 12/1999 | Toyoda et al. ............... 382/124 |
| 2006/0224900 A1 | | 10/2006 | Watanabe et al. |
| 2008/0240515 A1 | | 10/2008 | Uno et al. |

FOREIGN PATENT DOCUMENTS

| | | |
|---|---|---|
| EP | 0766192 | 4/1997 |
| JP | 2000-306095 | 11/2000 |
| JP | 2002-208011 | 7/2002 |
| JP | 2005-182184 | 7/2005 |
| JP | 2006-277448 | 10/2006 |
| JP | 2008-243054 | 10/2008 |
| JP | 2010-152706 | 7/2010 |

OTHER PUBLICATIONS

Extended European Search Report dated Jun. 6, 2012 issued in corresponding European Patent Application No. 11192973.3.
A.K. Jain et al., "5.4 Technology", Handbook of Biometrics, 2008, Springer Science, pp. 97, 100.
D. Maltoni , et a., "4.3 Minutiae-Based Methods", Handbook of Fingerprint Recognition, 2003, Springer Verlag, pp. 181.

* cited by examiner

*Primary Examiner* — Brian P Werner
(74) *Attorney, Agent, or Firm* — Staas & Halsey LLP

(57) ABSTRACT

A biometric authentication device includes a storage unit that stores a plurality of pieces of reference biometric data, an identification control unit that extracts reference biometric data where a coefficient for determining a similarity to acquired biometric data is greater than or equal to a first threshold value, a similar region extraction unit that obtains coefficients for determining similarities between the plural pieces of extracted reference biometric data, in units of predetermined regions, and extracts a similar region where the coefficient for similarity determination is greater than or equal to a second threshold value when a plurality of pieces of reference biometric data are extracted by the identification control unit, and a judgment unit that weights a coefficient for determining a similarity to a dissimilar region, compared with the coefficient for determining a similarity to the extracted similar region, and judging the degree of similarity.

20 Claims, 14 Drawing Sheets

| | 64 | | |
|---|---|---|---|
| 0 | 0 | 0 | 0 |
| −1 | −1 | 0 | 0 |
| −1 | −1 | 0 | 0 |
| −1 | 0 | 0 | 0 |
| 0 | 0 | 0 | 0 |

|  |  |  |  |
|---|---|---|---|
| +1 | +1 | +1 | +1 |
| −1 | −1 | +1 | +1 |
| −1 | −1 | +1 | +1 |
| −1 | +1 | +1 | +1 |
| +1 | +1 | +1 | +1 |

74 points to row 2; 71 points to row 2 (−1); 72 points to row 3 (−1); 73 points to row 4 (−1); 75 points into row 3.

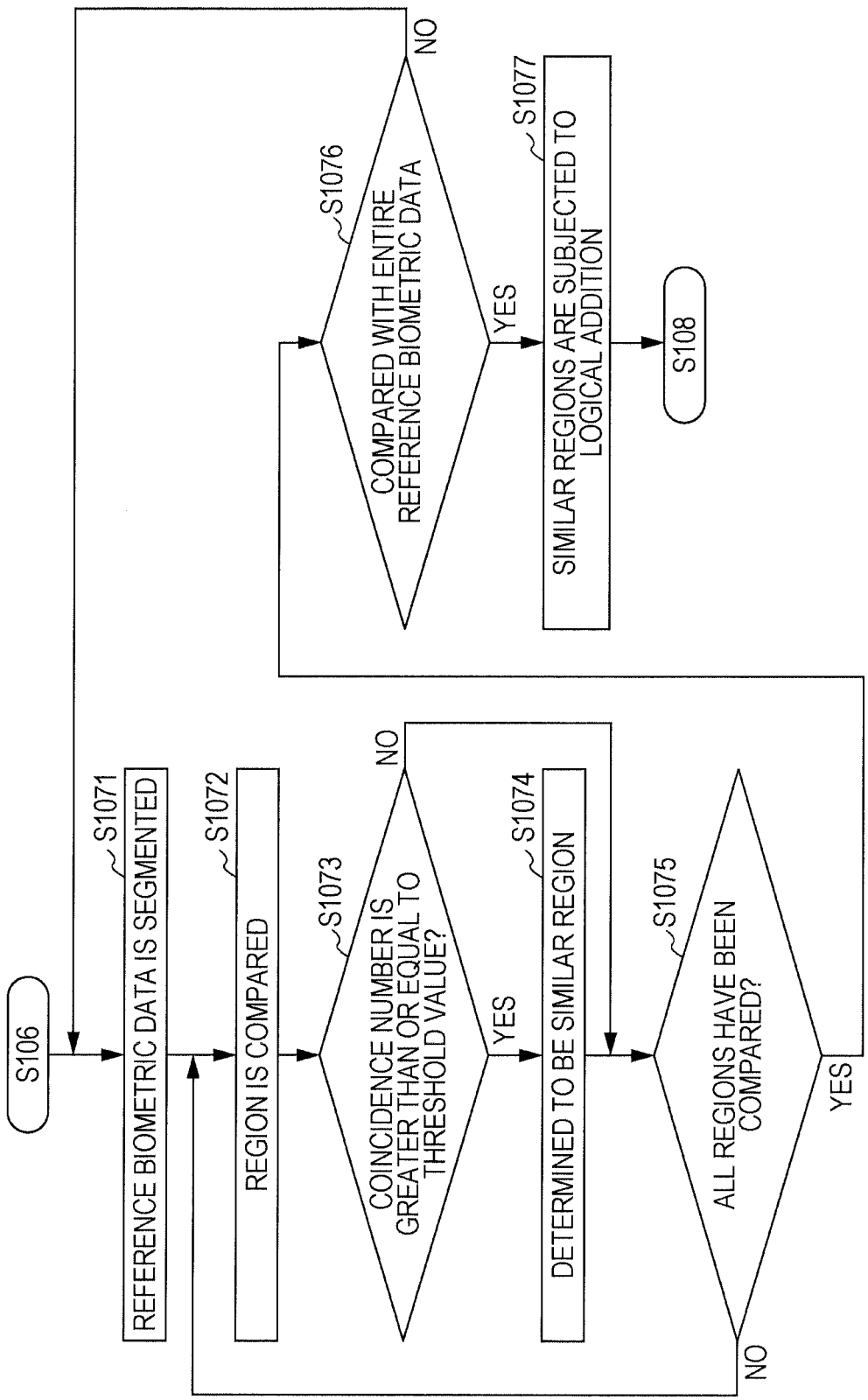

FIG. 10

| | REFERENCE BIOMETRIC DATA 510 | REFERENCE BIOMETRIC DATA 520 | REFERENCE BIOMETRIC DATA 530 |
|---|---|---|---|
| COINCIDENCE NUMBER OF CHARACTERISTIC POINTS WITH RESPECT TO BIOMETRIC DATA | 20 > (10) | 17 > (10) | 12 > (10) |
| COINCIDENCE NUMBER OF CHARACTERISTIC POINTS IN SIMILAR REGIONS BETWEEN PIECES OF REFERENCE BIOMETRIC DATA | 10 | 15 | 9 |
| COINCIDENCE NUMBER OF CHARACTERISTIC POINTS IN DISSIMILAR REGIONS BETWEEN PIECES OF REFERENCE BIOMETRIC DATA | 10 | 2 | 3 |

FIG. 11

| | REFERENCE BIOMETRIC DATA 510 | REFERENCE BIOMETRIC DATA 520 | REFERENCE BIOMETRIC DATA 530 |
|---|---|---|---|
| COINCIDENCE NUMBER OF CHARACTERISTIC POINTS IN SIMILAR REGIONS BETWEEN PIECES OF REFERENCE BIOMETRIC DATA | 4 | 6 | 3.6 |
| COINCIDENCE NUMBER OF CHARACTERISTIC POINTS IN DISSIMILAR REGIONS BETWEEN PIECES OF REFERENCE BIOMETRIC DATA | 10 | 2 | 3 |
| COINCIDENCE NUMBER OF CHARACTERISTIC POINTS WITH RESPECT TO BIOMETRIC DATA | 14 > (10) | 8 < (10) | 6.6 < (10) |

BIOMETRIC AUTHENTICATION DEVICE, METHOD OF CONTROLLING BIOMETRIC AUTHENTICATION DEVICE AND NON-TRANSITORY, COMPUTER READABLE STORAGE MEDIUM

CROSS-REFERENCE TO RELATED APPLICATION

This application is based upon and claims the benefit of priority of the prior Japanese Patent Application No. 2011-013436, filed on Jan. 25, 2011, the entire contents of which are incorporated herein by reference.

FIELD

The present art relates to a biometric authentication device, a method of controlling a biometric authentication device, and a non-transitory, computer readable storage medium

BACKGROUND

As one of biometric authentication methods, there is a one-to-N authentication method. The one-to-N authentication method is a method in which, even if there is not information for identifying a user, such as the ID or the like of the user who is a verifier, individual authentication is performed by comparing the biometric data of the user with the preliminarily stored reference biometric data of a plurality of users.

In the one-to-N authentication method, when the number of pieces of the reference biometric data stored in a database increases, there is increased the likelihood that input biometric data becomes similar to the reference biometric data of another user. Accordingly, a false acceptance rate at the time of authentication is increased, and there is increased a risk that an individual is authenticated as the other user.

For example, there is a technique in which a list of biometric information registration data having the high degree of similarity is preliminarily prepared and only when biometric data is similar to the listed registration data at the time of the execution of authentication, an individual judgment threshold value is strictly changed and authentication is performed. An example of such a technique is disclosed in Japanese Laid-open Patent Publication No. 2005-182184.

In addition, for example, there is a technique in which individual judgment threshold values are provided in units of registration data and when there are a plurality of pieces of registration data where the degrees of similarities to pieces of biometric information inputted from a user exceed a threshold value, individual judgment threshold values corresponding to these pieces of registration data are strictly realigned. An example of such a technique is disclosed in Japanese Laid-open Patent Publication No. 2008-243054.

However, in the above-mentioned techniques, while the individual judgment threshold values are strictly realigned and it is possible to reduce a false acceptance rate, a false rejection rate increases and an authentication success rate decreases.

SUMMARY

According to an aspect of an invention, a biometric authentication device includes a storage unit that stores a plurality of pieces of reference biometric data, an identification control unit that extracts reference biometric data where a coefficient for determining a similarity to acquired biometric data is greater than or equal to a first threshold value, a similar region extraction unit that obtains coefficients for determining similarities between the plural pieces of extracted reference biometric data, in units of predetermined regions, and extracting a similar region where the coefficient for similarity determination is greater than or equal to a second threshold value when a plurality of pieces of reference biometric data are extracted by the identification control unit; and a judgment unit that weights a coefficient for determining a similarity to a dissimilar region, compared with the coefficient for determining a similarity to the extracted similar region, and judging the degree of similarity between the biometric data and the plural pieces of extracted reference biometric data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating one embodiment of similarity information data.

FIG. 7 is a diagram illustrating one embodiment of similarity information data.

FIG. 9 is a flowchart illustrating one embodiment of extraction processing for a similar region.

FIG. 10 is a diagram illustrating the coincidence number of characteristic points between biometric data and reference biometric data.

FIG. 11 is a diagram illustrating the coincidence number of characteristic points between biometric data and reference biometric data.

DESCRIPTION OF EMBODIMENTS

Hereinafter, a biometric authentication device and a biometric authentication system in the present embodiment will be described.

First Embodiment

Figure 1:
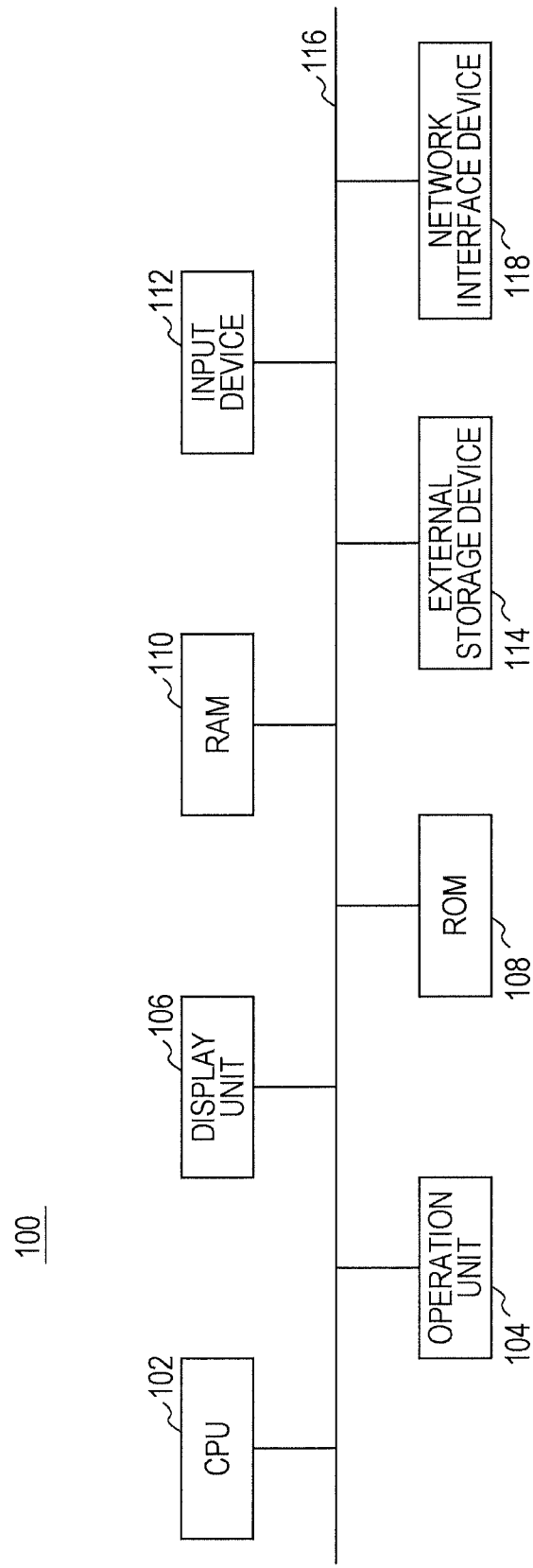
FIG. 1 is a block diagram simply illustrating one embodiment of a hardware configuration of a biometric authentication device.

FIG. 1 is a block diagram simply illustrating an example of the hardware configuration of a biometric authentication device 100 in the present embodiment. The biometric authentication device 100 includes a central processing unit (CPU:

central processor) 102, an operation unit 104, a display unit 106, a ROM 108, a RAM 110, an input device 112, an external storage device 114, and a network interface device 118. A bus 116 connects the CPU 102, the operation unit 104, the display unit 106, the ROM 108, the RAM 110, the input device 112, the external storage device 114, and the network interface device 118 to one another.

The CPU 102 executes various kinds of arithmetic processing. The operation unit 104 accepts the input of data from a user who is a verifier. The display unit 106 displays various kinds of information. The ROM 108 stores therein various kinds of programs such as an operating system (OS) and the like. The RAM 110 performs the execution of a program and the storage of data. The input device 112 reads out the biometric information of the user, as an image. The external storage device 114 stores therein a biometric authentication program, the reference biometric data of a plurality of registrants, and the like. The network interface device 118 transmits and receives data to and from another device through a network. In addition, for example, the biometric authentication program may be stored in a computer-readable recording medium such as a portable recording medium such as CD-ROM, a DVD disk, a USB memory, or the like or a semiconductor memory such as a flash memory or the like.

When, using the operation unit 104, the user performs an instruction that the user wants to perform biometric authentication, the CPU 102 displays, in the display unit 106, a message prompting the user to ginput biometric information using the input device 112. The input device 112 acquires the biometric information of the user, as the image. In addition, the CPU 102 executes the biometric authentication program, by reading out and deploying the biometric authentication program from the external storage device 114 and in the RAM 110. By causing the biometric authentication program to be executed, the CPU 102 generates biometric data from the image of the biometric information read out by the input device 112, and compares the biometric data with the reference biometric data of a plurality of users, stored in the external storage device 114, thereby executing biometric authentication. In addition, in the present embodiment, a fingerprint is used as the biometric information, and the user causes a finger to be swept by a fingerprint sensor that is the input device 112, thereby inputting the biometric information. In addition, for example, when palm veins are used as the biometric information, a palm vein sensor is used as the input device 112, and the user only has to hold the palm over the palm vein sensor.

Figure 2:
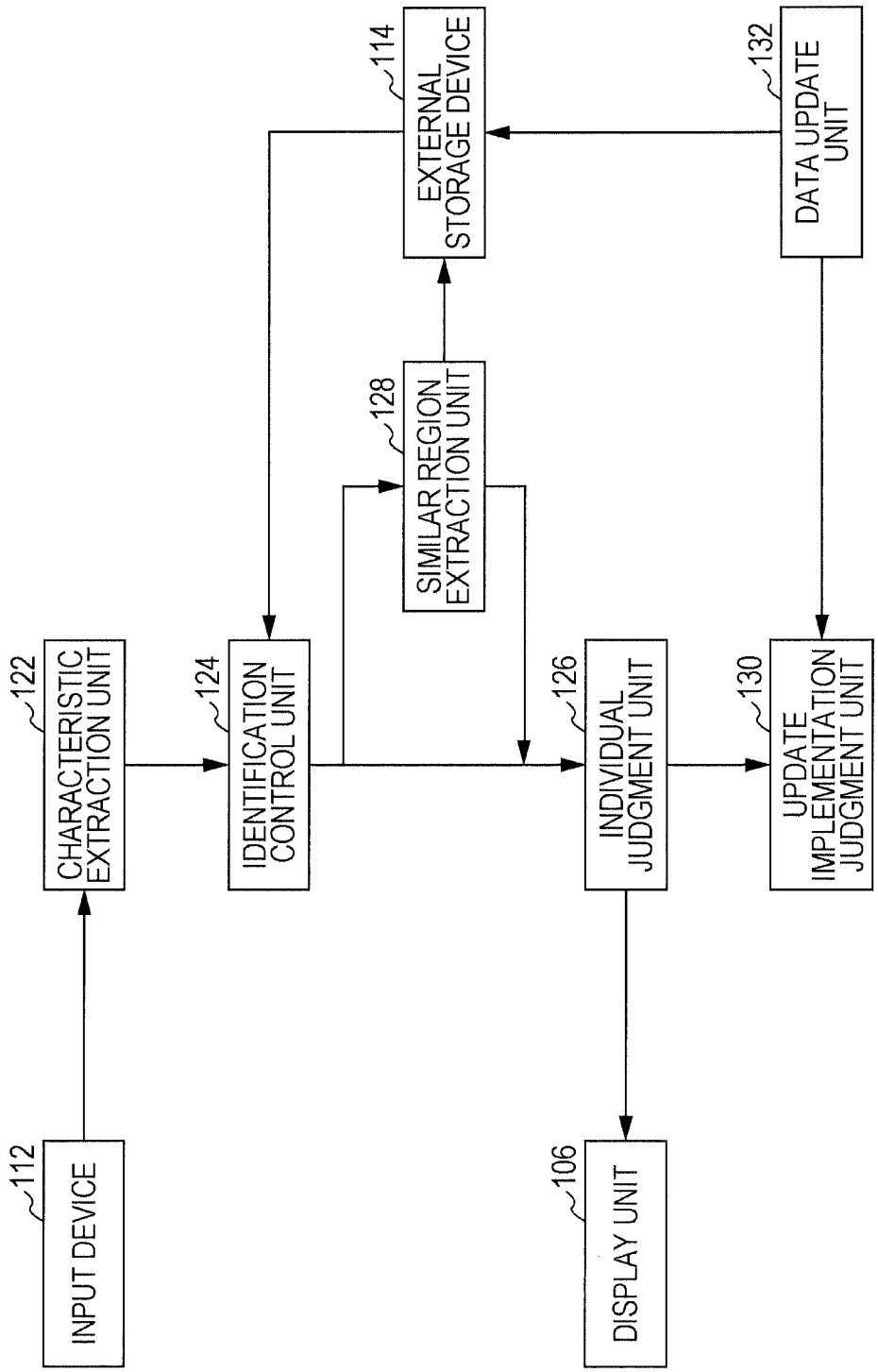
FIG. 2 is a block diagram simply illustrating one embodiment of authentication processing.

FIG. 2 is a functional block diagram simply illustrating an example of a relationship between the biometric authentication program deployed in the RAM 110, the input device 112, the external storage device 114, and the display unit 106. The CPU 102 executes the biometric authentication program, and hence functions as a characteristic extraction unit 122, an identification control unit 124, an individual judgment unit 126, a similar region extraction unit 128, an update implementation judgment unit 130, and a data update unit 132.

The characteristic extraction unit 122 extracts characteristic information from the image of the biometric information of the user, acquired by the input device 112, and generates the biometric data of the user. When, in the present embodiment, the fingerprint is used as the biometric information, minutia points are defined as characteristic information, the characteristic points including an ending point that is a point at which a ridge is disconnected, a bifurcation point from which a ridge branches into two ridges, a center point that is the center of a fingerprint pattern, a delta at which ridges concentrate from three directions, and the like. In addition, the location information of the ending point, the bifurcation point, the center point, the delta, and the like may be defined as the characteristic information.

The external storage device 114 stores therein the reference biometric data, similar region data, and the like. In addition, the similar region data will be described later.

The identification control unit 124 compares a coincidence number between the characteristic information of the biometric data generated by the characteristic extraction unit 122 and the characteristic information of the reference biometric data stored in the external storage device 114, using a first threshold value. Here, the coincidence number is the number of points at which the characteristic information of the biometric data generated by the characteristic extraction unit 122 coincides with the characteristic information of the reference biometric data stored in the external storage device 114. Specifically, the identification control unit 124 compares the position coordinates or the like of the characteristic information of the biometric data with the position coordinates or the like of the characteristic information of the reference biometric data of each user, and judges whether or not the coincidence number of the position coordinates of the characteristic information is greater than or equal to the first threshold value. It is desirable that the first threshold value is a value where the user is uniquely determined. In the present embodiment, the coincidence number is used as a coefficient for similarity determination.

In addition, the identification control unit 124 refers to the similar region data corresponding to the reference biometric data at the time of comparison, and weights a region judged to be a similar region in the reference biometric data, thereby calculating the coincidence number. For example, when the characteristic points of the fingerprint are used as the characteristic information, the identification control unit 124 assigns negative weighting to a characteristic point existing in the region in the reference biometric data, judged to be the similar region on the basis of the similar region data. By assigning negative weighting to the characteristic point existing in the region judged to be the similar region in the reference biometric data, the identification control unit 124 can perform the comparison of the coincidence number, with emphasis on characteristic information whose discrimination from another user is high. In addition, the weighting processing of the identification control unit 124 will be described later.

On the basis of a second threshold value, the similar region extraction unit 128 determines a similar region between a plurality of pieces of the reference biometric data of individual candidates extracted by the identification control unit 124. Specifically, first, the similar region extraction unit 128 acquires reference biometric data where the coincidence number between the reference biometric data and the biometric data of the user is greater than or equal to the first threshold value. Next, the similar region extraction unit 128 segments each of pieces of the acquired reference biometric data into a predetermined number of regions as blocks. In addition, the similar region extraction unit 128 compares characteristic information between individual pieces of the reference biometric data, and judges, as a similar region, a region where the number of coincidence points is greater than or equal to the second threshold value. In addition, with respect to each of pieces of the reference biometric data, the similar region extraction unit 128 creates, as similar region data, information relating to a region similar between the plural pieces of the reference biometric data of individual candidates extracted by the identification control unit 124, and stores the information in the external storage device 114.

Figure 3:
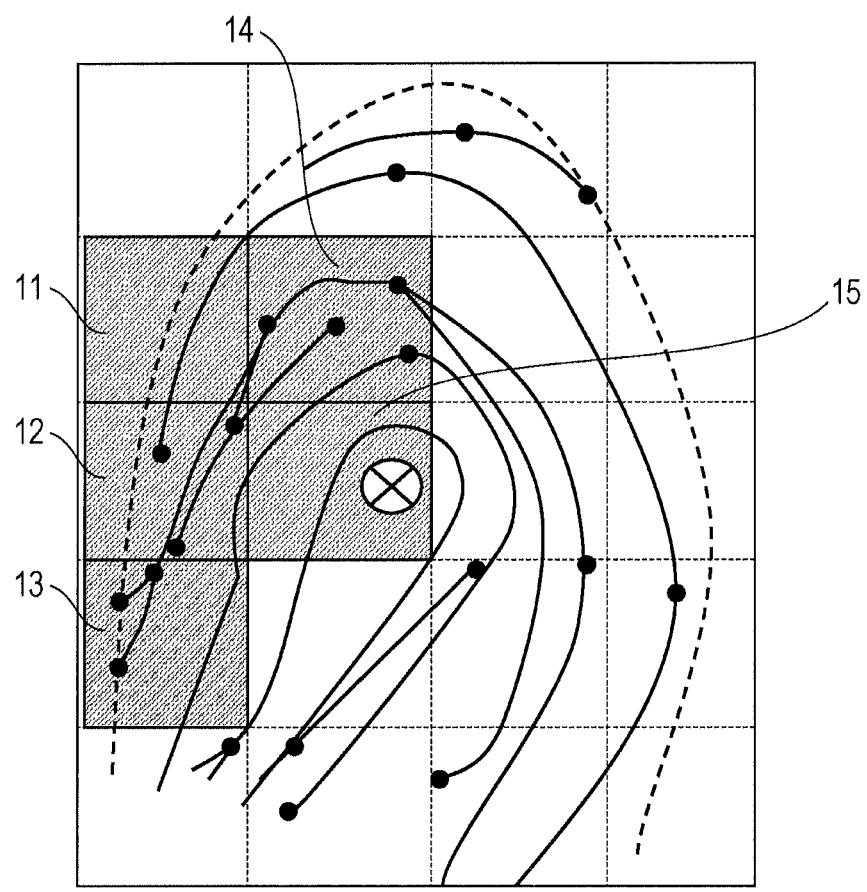
FIG. 3 is a diagram illustrating one embodiment of reference biometric data.
Figure 4:
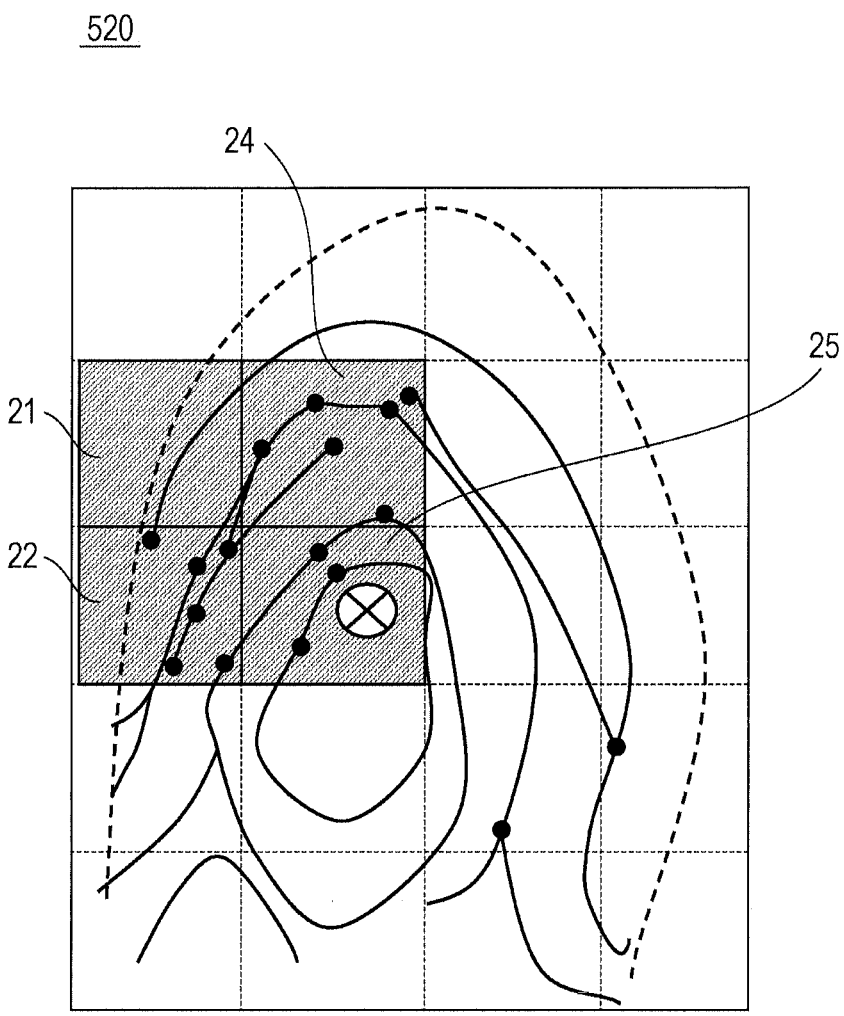
FIG. 4 is a diagram illustrating one embodiment of reference biometric data.
Figure 5:
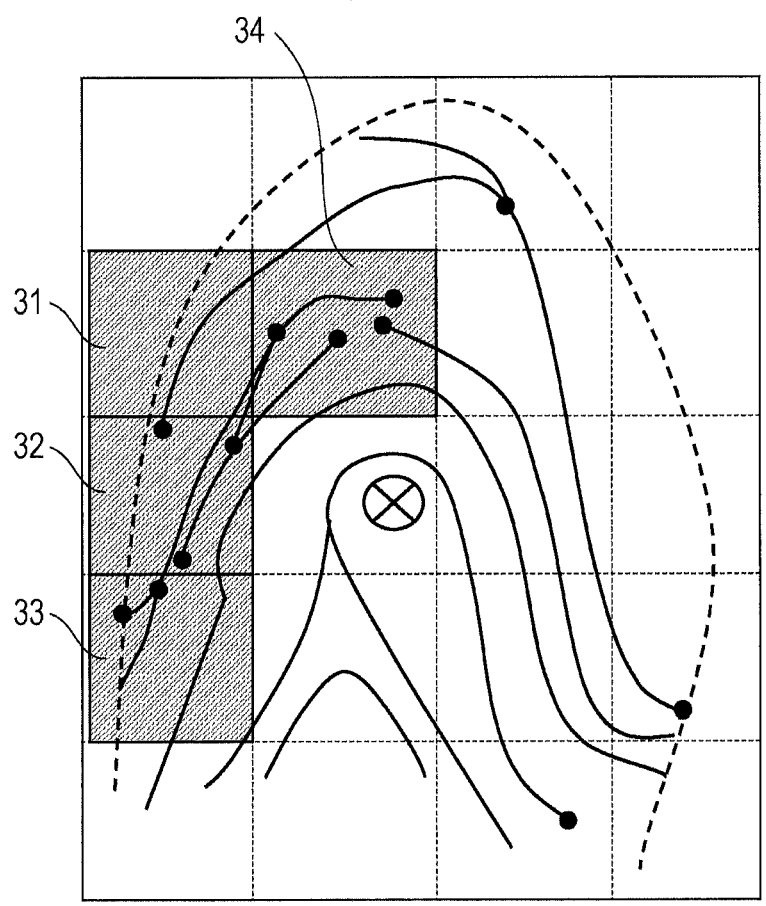
FIG. 5 is a diagram illustrating one embodiment of reference biometric data.

Subsequently, the detailed processing of the similar region extraction unit 128 will be described with reference to FIG. 3, FIG. 4, and FIG. 5. In the present embodiment, a case will be describe in which, in regard to the reference biometric data where the coincidence number with respect to the biometric data of the user is greater than or equal to the first threshold value, there exist three pieces of the reference biometric data, namely, reference biometric data 510 illustrated in FIG. 3, reference biometric data 520 illustrated in FIG. 4, and reference biometric data 530 illustrated in FIG. 5. While, in the present embodiment, an example will be described in which each of pieces of the reference biometric data is segmented into 20 blocks that are 5 blocks in height and 4 blocks in width, the number of segmented blocks is not limited to the example.

Firstly, processing will be described in which the similar region extraction unit 128 determines similar regions in the reference biometric data 510. It is assumed that the similar region extraction unit 128 has compared the reference biometric data 510 with the reference biometric data 520 and, as a result, judges that blocks 11, 12, 14, and 15 in the reference biometric data 510 and blocks 21, 22, 24, and 25 in the reference biometric data 520 are similar regions individually. Next, it is assumed that the similar region extraction unit 128 has compared the reference biometric data 510 with the reference biometric data 530 and, as a result, judges that blocks 11, 12, 13, and 14 in the reference biometric data 510 and blocks 31, 32, 33, and 34 in the reference biometric data 530 are similar regions individually. In this case, the similar region extraction unit 128 determines that the blocks 11, 12, 13, 14, and 15, obtained by subjecting the similar regions with respect to the reference biometric data 520 and the reference biometric data 530 to logical addition, are regions to be subjected to negative weighting.

Next, processing will be described in which the similar region extraction unit 128 determines similar regions in the reference biometric data 520. It is assumed that the similar region extraction unit 128 has compared the reference biometric data 520 with the reference biometric data 510 and, as a result, judges that blocks 21, 22, 24, and 25 in the reference biometric data 520 and blocks 11, 12, 14, and 15 in the reference biometric data 510 are similar regions individually. In addition, it is assumed that the similar region extraction unit 128 has compared the reference biometric data 520 with the reference biometric data 530 and, as a result, judges that blocks 21, 22, and 24 in the reference biometric data 520 and blocks 31, 32, and 34 in the reference biometric data 530 are similar regions individually. In this case, the similar region extraction unit 128 determines that the blocks 21, 22, 24, and 25, obtained by subjecting the similar regions with respect to the reference biometric data 510 and the reference biometric data 530 to logical addition, are regions to be subjected to negative weighting.

Finally, processing will be described in which the similar region extraction unit 128 determines similar regions in the reference biometric data 530. It is assumed that the similar region extraction unit 128 has compared the reference biometric data 530 with the reference biometric data 510 and, as a result, judges that blocks 31, 32, 33, and 34 in the reference biometric data 530 and blocks 11, 12, 13, and 14 in the reference biometric data 510 are similar regions individually. In addition, it is assumed that the similar region extraction unit 128 has compared the reference biometric data 530 with the reference biometric data 520 and, as a result, judges that blocks 31, 32, and 34 in the reference biometric data 530 and blocks 21, 22, and 24 in the reference biometric data 520 are similar regions individually. In this case, the similar region extraction unit 128 determines that the blocks 31, 32, 33, and 34, obtained by subjecting the similar regions with respect to the reference biometric data 510 and the reference biometric data 520 to logical addition, are regions to be subjected to negative weighting.

The similar region extraction unit 128 generates similar region data relating to the similar regions in the reference biometric data 510, the reference biometric data 520, and the reference biometric data 530, and stores the similar region data in the external storage device 114. In addition, the second threshold value is a value obtained by dividing the first threshold value by the number of segmented blocks.

Figure 6:
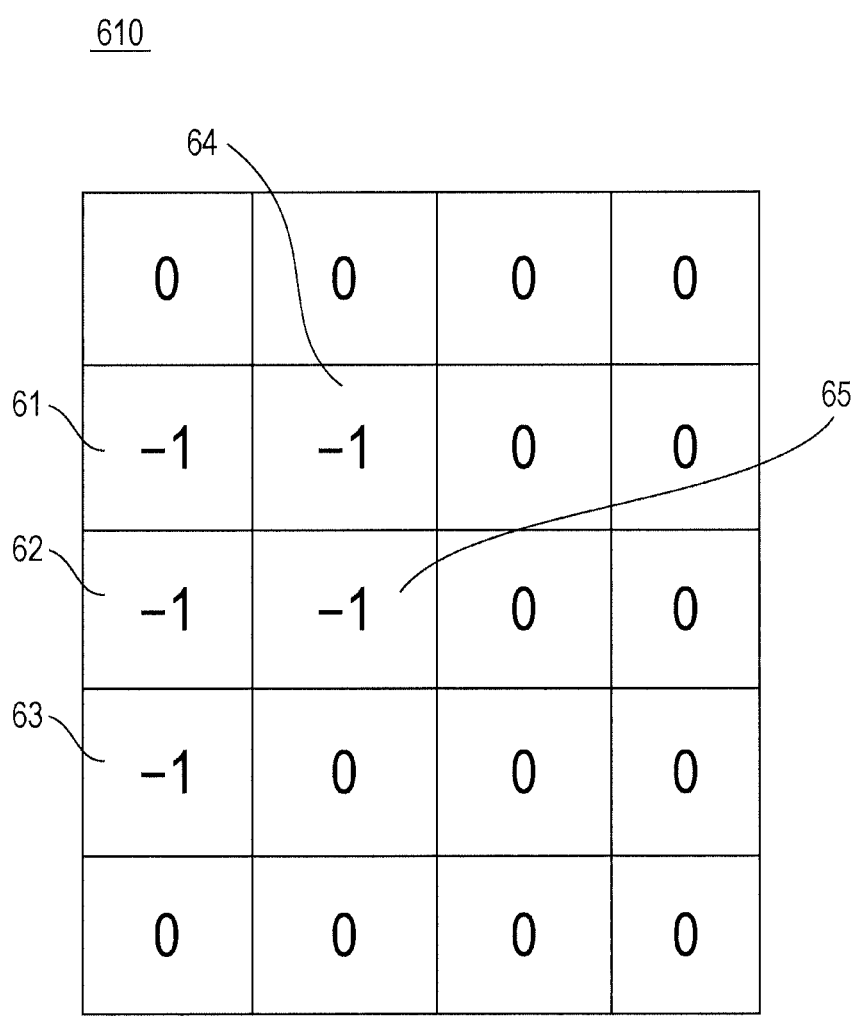

FIG. 6 illustrates similar region data 610 corresponding to the reference biometric data 510. In the reference biometric data 510 illustrated in FIG. 3, "−1" is associated with blocks 61, 62, 63, 64, and 65 corresponding to regions determined to be similar regions by the similar region extraction unit 128. "0" is associated with the other blocks. The identification control unit 124 assigns negative weighting to the regions of the reference biometric data corresponding to the blocks associated with "−1". In the same way, similar region data relating to the reference biometric data 520 and the reference biometric data 530 is also generated by the similar region extraction unit 128.

The individual judgment unit 126 performs individual judgment on the basis of the comparison result of the coincidence number in the identification control unit 124. Specifically, on the basis of the comparison result of the coincidence number in the identification control unit 124, when the number of pieces of the reference biometric data coinciding with the input biometric data is one, the individual judgment unit 126 judges that the biometric data corresponds to a user individual. On the other hand, on the basis of the comparison result of the coincidence number in the identification control unit 124, when the number of pieces of the reference biometric data coinciding with the input biometric data is not one, the individual judgment unit 126 judges that the biometric data does not correspond to a user individual.

By referring to the similar region data corresponding to the reference biometric data judged to correspond to the individual, the update implementation judgment unit 130 judges whether or not the corresponding reference biometric data is to be updated. Specifically, the update implementation judgment unit 130 judges whether or not a weight, assigned to each of the regions of the similar region data corresponding to the reference biometric data judged to correspond to the individual, is greater than or equal to "0". In addition, when the weight assigned to each of the regions of the corresponding similar region data is greater than or equal to "0", the update implementation judgment unit 130 judges that it is not necessary to update the corresponding reference biometric data. That the weight assigned to each of the regions of the similar region data is greater than or equal to "0" indicates that there is no region similar to the other reference biometric data and the corresponding reference biometric data is reference biometric data whose discrimination from anyone else is high. In addition, when a value, obtained by summing the similarity information of each of the regions of the reference biometric data of the identified user, is greater than or equal to a predetermined value, the update implementation judgment unit 130 may judge that the corresponding reference biometric data is an update target.

By referring to the similar region data corresponding to the reference biometric data judged to correspond to the individual, the data update unit 132 adds the information of the input biometric data, thereby updating the reference biometric data. Specifically, by referring to the corresponding similar region data, the data update unit 132 extracts the dissimilar region of the reference biometric data, as an update target region. Using the region corresponding to the corresponding update target region from the input biometric data, the data update unit 132 replaces and updates the reference biometric data of the update target. In addition, the data update unit 132 performs positive weighting for the region whose reference biometric data has been updated. Accordingly, using the latest biometric data of the user, it is possible to update the reference biometric data, and it is possible to generate reference biometric data corresponding to the temporal change of the biometric data of the user.

FIG. 7 illustrates similar region data 710 corresponding to the reference biometric data 510. "−1" is associated with blocks 71, 72, 73, 74, and 75 corresponding to regions determined to be similar regions in the reference biometric data 510 illustrated in FIG. 3. In addition, "+1" is associated with blocks corresponding to regions updated by the data update unit 132 in the reference biometric data 510 illustrated in FIG. 3.

Figure 8:
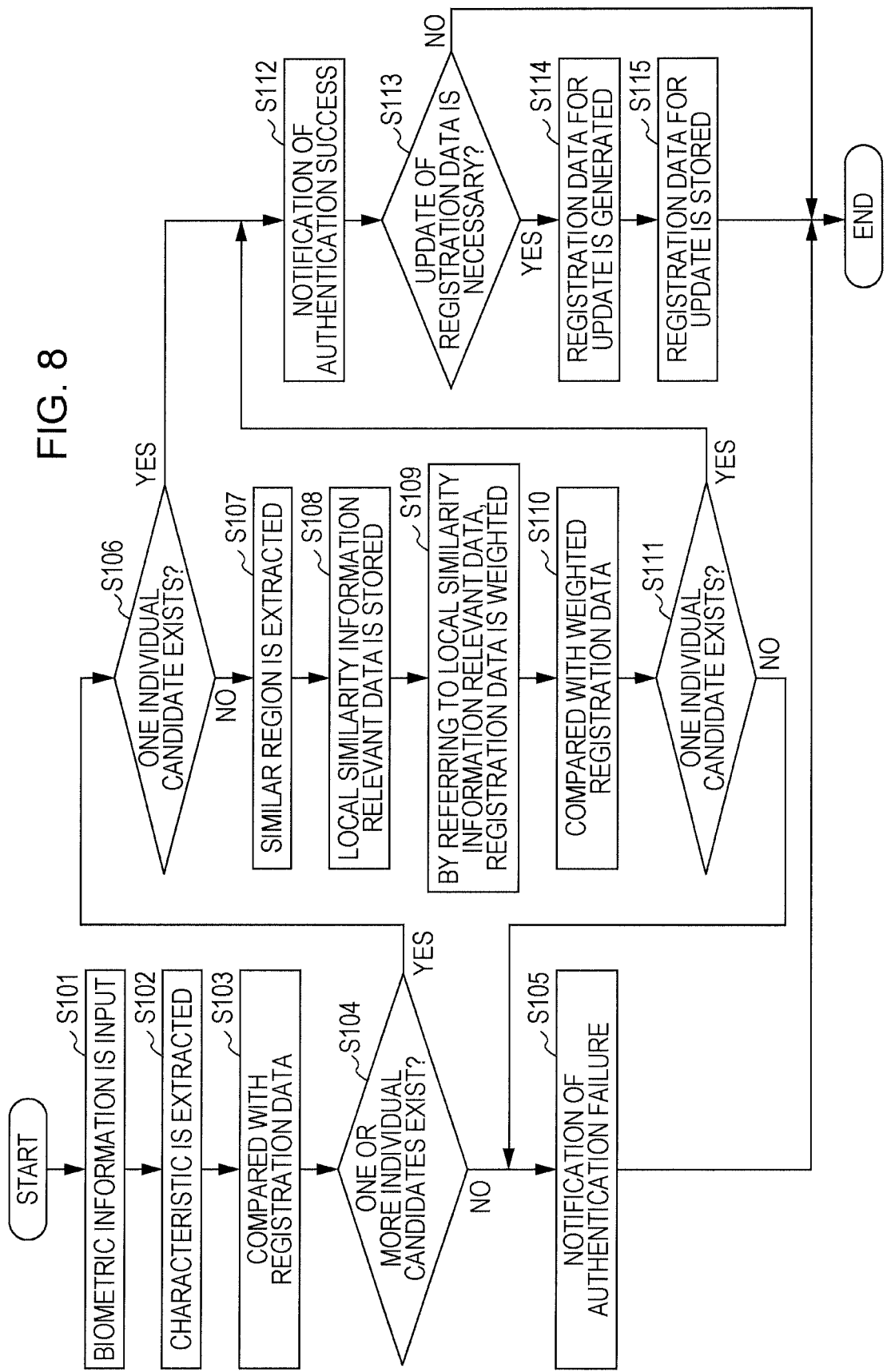
FIG. 8 is a flowchart illustrating one embodiment of processing performed in a biometric authentication device.

Hereinafter, using FIG. 8, the processing of the biometric authentication device 100 in the present embodiment will be described.

In S101, the user inputs the biometric information using the input device 112. The input device 112 acquires the biometric information of the user, as an image. The processing transfers to S102.

In S102, the characteristic extraction unit 122 extracts characteristic information from the image of the biometric information input from the input device 112 by the user, and generates the biometric data of the user to be used at the time of authentication. The processing transfers to S103.

In S103, the identification control unit 124 compares the biometric data of the user, generated by the characteristic extraction unit 122, with the reference biometric data of a plurality of users, preliminarily stored in the external storage device 114, and judges whether or not the coincidence number is greater than or equal to the first threshold value. The processing transfers to S104.

In S104, the individual judgment unit 126 judges whether or not there is at least one piece of the reference biometric data where the coincidence number between the reference biometric data and the biometric data of the user is greater than or equal to the first threshold value. When there is at least one piece of the reference biometric data where the coincidence number between the reference biometric data and the biometric data of the user is greater than or equal to the first threshold value, the processing transfers to S106. On the other hand, when there is no piece of the reference biometric data where the coincidence number between the reference biometric data and the biometric data of the user is greater than or equal to the first threshold value, the processing transfers to S105.

In S105, the individual judgment unit 126 displays information indicating an authentication failure in the display unit 106, and notifies the user of the authentication failure. The processing is terminated.

Subsequently, a case will be described in which, in S104, the individual judgment unit 126 judges that there is at least one piece of the reference biometric data where the coincidence number between the reference biometric data and the biometric data of the user is greater than or equal to the first threshold value.

In S106, the individual judgment unit 126 judges whether or not there is one piece of the reference biometric data where the coincidence number between the reference biometric data and the biometric data of the user is greater than or equal to the first threshold value. When there is one piece of the reference biometric data where the coincidence number between the reference biometric data and the biometric data of the user is greater than or equal to the first threshold value, the processing transfers to S112. On the other hand, when there is more than one piece of the reference biometric data where the coincidence number between the reference biometric data and the biometric data of the user is greater than or equal to the first threshold value, the processing transfers to S107.

In S107, on the basis of the second threshold value, the similar region extraction unit 128 extracts a similar region between a plurality of pieces of the reference biometric data of individual candidates detected by the identification control unit 124.

Here, using FIG. 9, processing in S107 will be described in detail.

In S1071, firstly, the similar region extraction unit 128 segments the reference biometric data to be compared into a predetermined number of regions. The processing transfers to S1072.

In S1072, the similar region extraction unit 128 compares characteristic points in a region. In addition, for example, a region where the characteristic points are compared may begin from a top-left region. The processing transfers to S1073.

In S1073, the similar region extraction unit 128 judges whether or not the coincidence number of the characteristic points in a region is greater than or equal to the second threshold value. When the coincidence number of the characteristic points in a region is greater than or equal to the second threshold value, the processing transfers to S1074. On the other hand, when the coincidence number of the characteristic points in a region is less than the second threshold value, the processing transfers to S1075.

In S1074, the similar region extraction unit 128 judges that the region where the coincidence number of the characteristic points is greater than or equal to the second threshold value is a similar region. The processing transfers to S1075.

In S1075, the similar region extraction unit 128 judges whether or not the comparison has been completed with respect to all regions of the reference biometric data. When the comparison has been completed with respect to all regions of the reference biometric data, the processing transfers to S1076. On the other hand, when the comparison has not been completed with respect to all regions of the reference biometric data, the processing returns to S1072.

In S1076, the similar region extraction unit 128 judges whether or not the comparison of characteristic points between all pieces of the reference biometric data extracted in S104 has been completed. When the comparison of characteristic points between all pieces of the reference biometric data has been completed, the processing transfers to S1077. On the other hand, when the comparison of characteristic points between all pieces of the reference biometric data has not been completed, the processing returns to S1071.

In S1076, the similar region extraction unit 128 subjects the similar regions extracted in S1074 to logical addition and generates local similarity information relevant data. The processing transfers to S108.

In S108, the similar region extraction unit 128 generates the similar region data with associating the similar region data with each of pieces of the reference biometric data, and stores the similar region data in the external storage device 114. The processing transfers to S109.

In S109, by referring to the similar region data generated in S108, the identification control unit 124 weights each of pieces of the reference biometric data where, in S104, it has been judged that the coincidence number between the reference biometric data and the biometric data of the user is greater than or equal to the first threshold value.

Here, the weighting processing of the present embodiment will be described. As illustrated in FIG. 10, the coincidence numbers of characteristic points between the biometric data and the reference biometric data 510, the reference biometric data 520, and the reference biometric data 530 are "20", "17", and "12", respectively. In FIG. 3, the coincidence number of characteristic points between the biometric data and the reference biometric data 510 is illustrated using black circles. In the same way, in FIG. 4, the coincidence number of characteristic points between the biometric data and the reference biometric data 520 is illustrated using black circles, and in FIG. 5, the coincidence number of characteristic points between the biometric data and the reference biometric data 530 is also illustrated using black circles. In this case, if the threshold value of the coincidence number is set to "10", since the coincidence numbers exceed the threshold value "10" with respect to three of the reference biometric data 510, the reference biometric data 520, and the reference biometric data 530, it turns out to be judged that each of the three of the reference biometric data 510, the reference biometric data 520, and the reference biometric data 530 corresponds to an individual candidate.

Next, the breakdowns of the coincidence numbers of characteristic points between the biometric data and the reference biometric data 510, the reference biometric data 520, and the reference biometric data 530 will be viewed. In the reference biometric data 510, the coincidence number of characteristic points in similar regions between pieces of the reference biometric data is "10", and the coincidence number of characteristic points in dissimilar regions between pieces of the reference biometric data is "10". In the reference biometric data 520, the coincidence number of characteristic points in similar regions between pieces of the reference biometric data is "15", and the coincidence number of characteristic points in dissimilar regions between pieces of the reference biometric data is "2". In the reference biometric data 530, the coincidence number of characteristic points in similar regions between pieces of the reference biometric data is "9", and the coincidence number of characteristic points in dissimilar regions between pieces of the reference biometric data is "3".

In the present embodiment, for example, the coincidence number of characteristic points in similar regions between pieces of the reference biometric data is multiplied by "0.4", thereby performing weighting. Accordingly, the individual judgment unit 126 can perform authentication in which a similar region similar to other reference biometric data is underestimated and a dissimilar region is valued, and hence it is possible to enhance a probability that an individual can be authenticated. In addition, the coefficient used for weighting may be an arbitrary value, and may be "0", for example. The processing transfers to S110.

In S110, the identification control unit 124 compares the biometric data of the user, generated by the characteristic extraction unit 122, with the registration data subjected to weighting in S109, and judges whether or not the coincidence number is greater than or equal to the first threshold value.

Here, the authentication processing after the weighting processing has been performed in the present embodiment will be described. FIG. 11 illustrates the breakdowns of the coincidence numbers of characteristic points between the biometric data and the reference biometric data 510, the reference biometric data 520, and the reference biometric data 530 after the weighting processing described in S109 has been performed. In the reference biometric data 510, the coincidence number of characteristic points in similar regions between pieces of the reference biometric data is "4" obtained by multiplying "10" by "0.4". In the reference biometric data 520, the coincidence number of characteristic points in similar regions between pieces of the reference biometric data is "6" obtained by multiplying "15" by "0.4". In the reference biometric data 530, the coincidence number of characteristic points in similar regions between pieces of the reference biometric data is "3.6" obtained by multiplying "9" by "0.4".

In regard to the coincidence number of characteristic points between the reference biometric data and the biometric data after the weighting processing has been performed, that of the reference biometric data 510 is "14", that of the reference biometric data 520 is "8", and that of the reference biometric data 530 is "6.6". Since only the reference biometric data 510 exceeds the threshold value "10" after the weighting processing has been performed, it is possible to uniquely identify the individual. The processing transfers to S111. In addition, in the present embodiment, taking it into consideration that the biometric data of the individual is totally similar to the reference biometric data of the individual and is locally similar to the reference biometric data of anyone else, the individual is uniquely identified.

In S111, the individual judgment unit 126 judges whether or not there is one piece of the reference biometric data where the coincidence number between the reference biometric data and the biometric data of the user is greater than or equal to the first threshold value. When there is one piece of the reference biometric data where the coincidence number between the reference biometric data and the biometric data of the user is greater than or equal to the first threshold value, the processing transfers to S112. On the other hand, when there is no piece of the reference biometric data where the coincidence number between the reference biometric data and the biometric data of the user is greater than or equal to the first threshold value, the processing transfers to S105. Since the processing in S105 is the same as the above-mentioned processing, the description thereof will be omitted. In addition, while, in S111, the first threshold value is used, a third threshold different from the first threshold value may be used.

In S112, the individual judgment unit 126 displays information indicating an authentication success in the display unit 106, and notifies the user of the authentication success. The processing transfers to S113.

In S113, on the basis of the similar region data corresponding to the reference biometric data judged to correspond to the individual, the update implementation judgment unit 130 judges whether or not the reference biometric data is to be updated. When the reference biometric data is to be updated, the processing transfers to S114. On the other hand, when the reference biometric data is not to be updated, the processing is terminated.

In S114, by referring to the similar region data corresponding to the reference biometric data judged to correspond to the individual, the data update unit 132 adds the information of the input biometric data to the reference biometric data, thereby updating the reference biometric data. The processing transfers to S115.

In S115, the data update unit 132 stores the reference biometric data updated in S114, in the external storage device 114. The processing is terminated.

As above, according to the first embodiment, the biometric authentication device performs authentication by weighting regions similar to other reference biometric data. Therefore, even if the biometric data of the user turns out to be similar to the reference biometric data of another user, it is possible to perform biometric authentication with emphasis on dissimilar regions. Therefore, according to the first embodiment, in a 1:N authentication method, it is possible to provide a biometric authentication device capable of maintaining an authentication success rate high.

In addition, the processing described in S108 may be performed when the user registers the reference biometric data in the biometric authentication device 100, for example.

Second Embodiment

Figure 12:
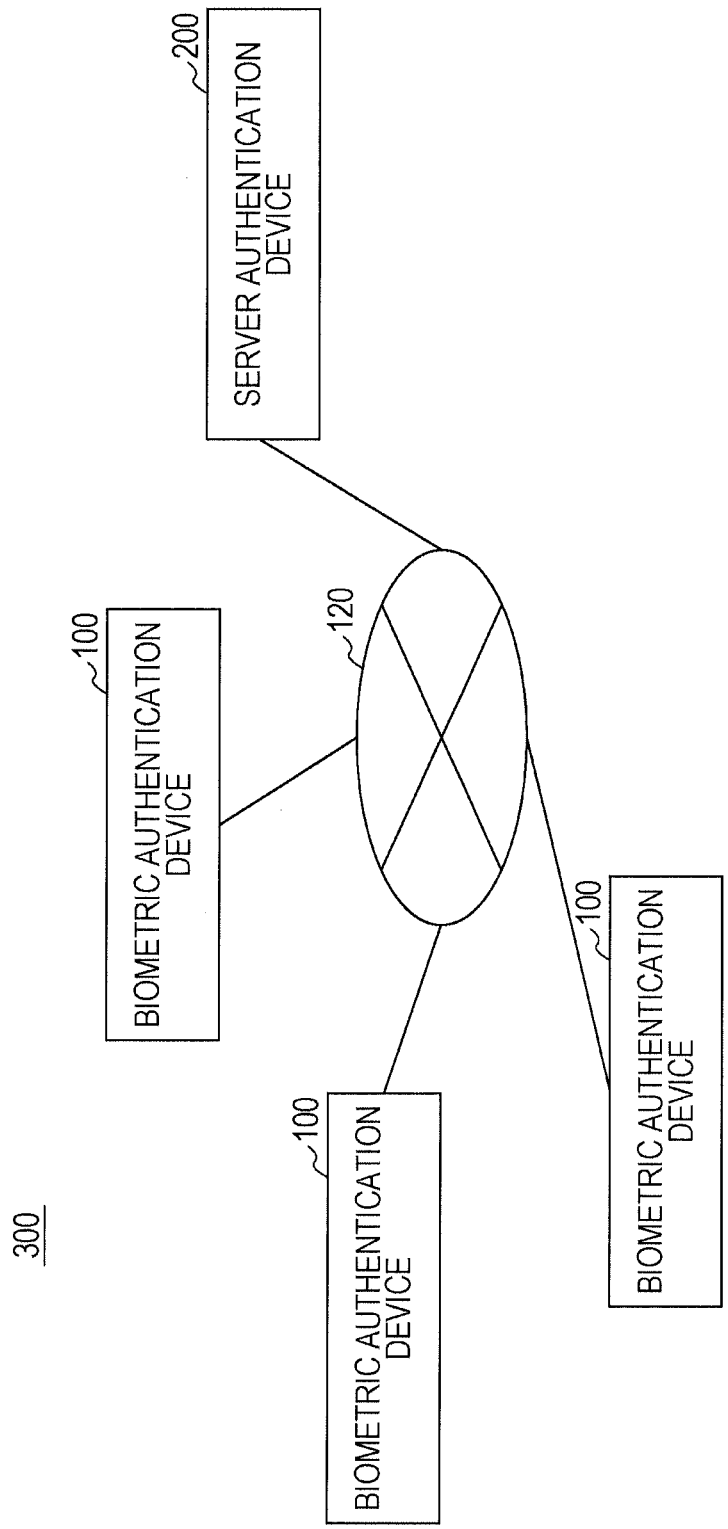
FIG. 12 is a diagram illustrating one embodiment of a biometric authentication system.

FIG. 12 illustrates a biometric authentication system 300 in the present embodiment. In the embodiment relating to the biometric authentication system 300, a case will be described in which, using the biometric data of a user, generated by the biometric authentication device 100, biometric authentication is performed in a server authentication device 200. The biometric authentication system 300 includes a plurality of the biometric authentication devices 100 that are clients, the server authentication device 200, and a network 120.

Figure 13:
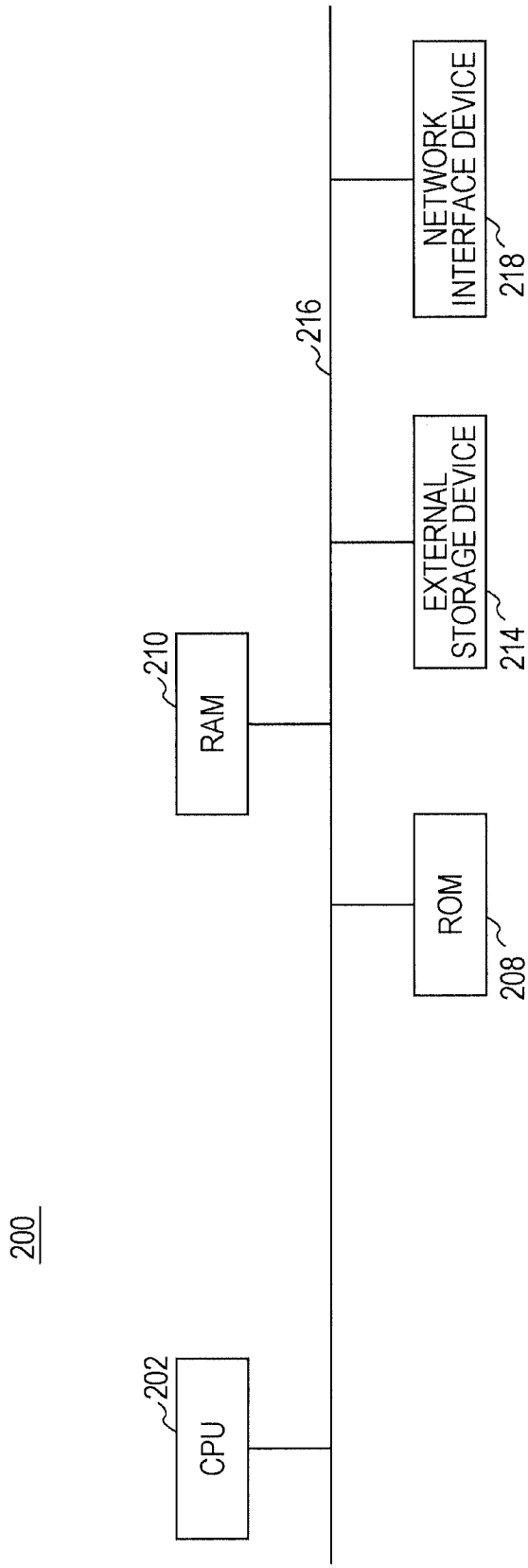
FIG. 13 is a block diagram simply illustrating one embodiment of a hardware configuration of a server authentication device.

FIG. 13 illustrates the server authentication device 200 in the present embodiment. The server authentication device 200 includes a CPU 202, a ROM 208, a RAM 210, an external storage device 214, and a network interface device 218. A bus 216 connects the CPU 202, the ROM 208, the RAM 210, the external storage device 214, and the network interface device 218 to each other.

The CPU 202 executes various kinds of arithmetic processing. The ROM 208 stores therein various kinds of programs such as OS and the like. The RAM 210 performs the execution of a program and the storage of data. The external storage device 214 stores therein a biometric authentication program, the reference biometric data to be the criterion of a user, and the like. The network interface device 218 transmits and receives data to and from the plural biometric authentication devices 100 through the network 120.

Figure 14:
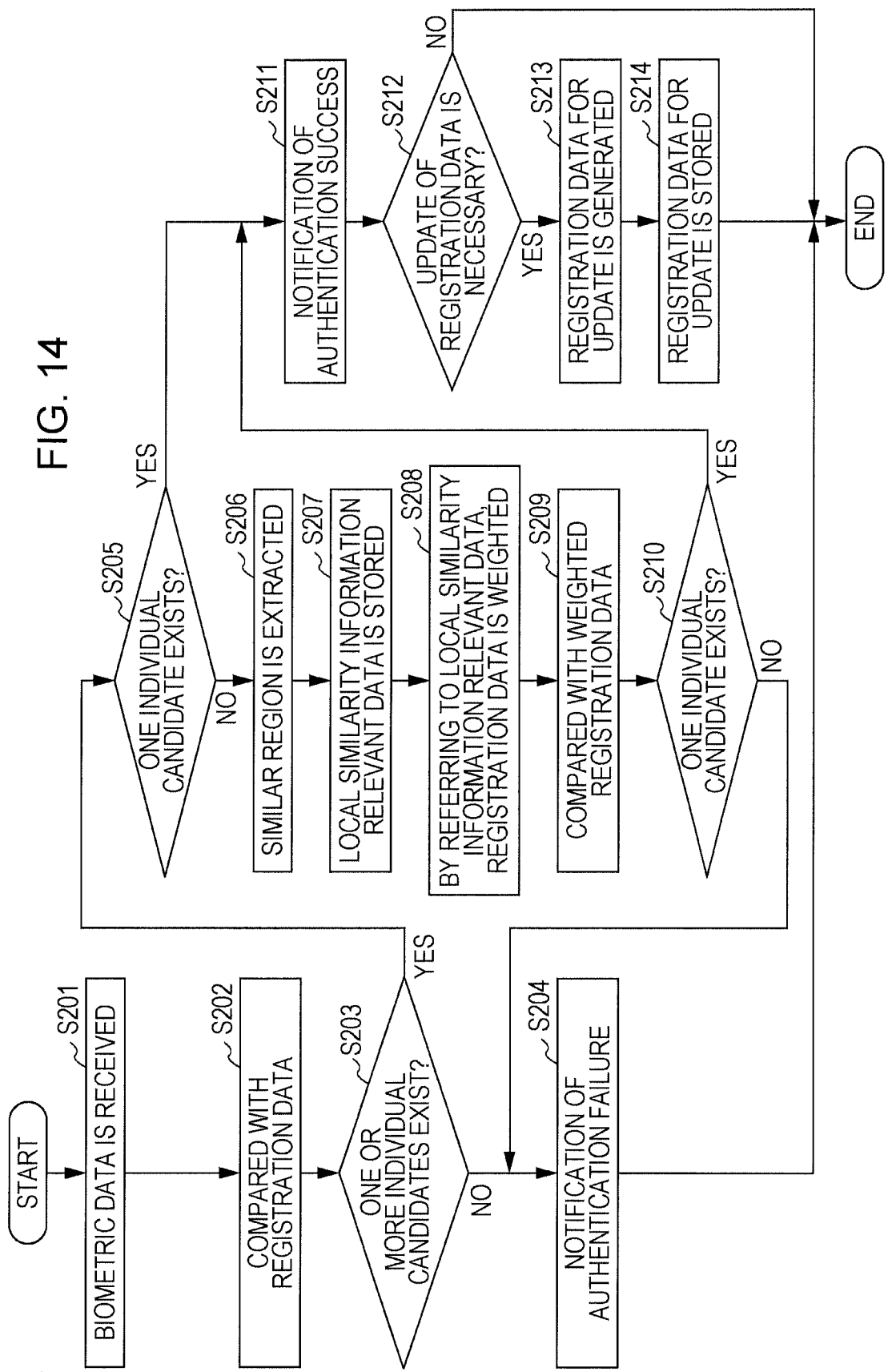
FIG. 14 is a flowchart illustrating one embodiment of processing performed in the server authentication device.

Hereinafter, using FIG. 14, the processing of the server authentication device 200 in the present embodiment will be described.

In S201, the CPU 202 receives the biometric data of the user, generated in the biometric authentication device 100, through the network interface device 218. The processing transfers to S202.

In S202, the CPU 202 compares the received biometric data of the use with the reference biometric data of a plurality of users, preliminarily stored in the external storage device 214, and judges whether or not the coincidence number is greater than or equal to the first threshold value. The processing transfers to S203.

In S203, the CPU 202 judges whether or not there is at least one piece of the reference biometric data where the coincidence number between the reference biometric data and the biometric data of the user is greater than or equal to the first threshold value. When there is at least one piece of the reference biometric data where the coincidence number between the reference biometric data and the biometric data of the user is greater than or equal to the first threshold value, the processing transfers to S205. On the other hand, when there is no piece of the reference biometric data where the coincidence number between the reference biometric data and the biometric data of the user is greater than or equal to the first threshold value, the processing transfers to S204.

In S204, the CPU 202 transmits information indicating an authentication failure, to the biometric authentication device 100 through the network interface device 218, and notifies the user of the authentication failure. The processing is terminated.

Subsequently, a case will be described in which, in S205, the CPU 202 judges that there is at least one piece of the reference biometric data where the coincidence number between the reference biometric data and the biometric data of the user is greater than or equal to the first threshold value.

In S205, the CPU 202 judges whether or not there is one piece of the reference biometric data where the coincidence number between the reference biometric data and the biometric data of the user is greater than or equal to the first threshold value. When there is one piece of the reference biometric data where the coincidence number between the reference biometric data and the biometric data of the user is greater than or equal to the first threshold value, the processing transfers to S211. When there is more than one piece of the reference biometric data where the coincidence number between the reference biometric data and the biometric data of the user is greater than or equal to the first threshold value, the processing transfers to S206.

In S206, on the basis of the second threshold value, the CPU 202 extracts a similar region between a plurality of pieces of the reference biometric data of individual candidates. The processing transfers to S207.

In S207, the CPU 202 generates the similar region data indicating a region similar to other reference biometric data, with associating the similar region data with each of pieces of the reference biometric data, and stores the similar region data in the external storage device 214. The processing transfers to S208.

In S208, by referring to the similar region data generated in S207, the identification control unit 124 weights each of pieces of the reference biometric data where, in S203, it has been judged that the coincidence number between the reference biometric data and the biometric data of the user is greater than or equal to the first threshold value.

In S209, the identification control unit 124 compares the biometric data of the user, generated by the characteristic extraction unit 122, with the registration data subjected to weighting in S208, and judges whether or not the coincidence number is greater than or equal to the first threshold value.

In S210, the individual judgment unit 126 judges whether or not there is one piece of the reference biometric data where the coincidence number between the reference biometric data and the biometric data of the user is greater than or equal to the first threshold value. When there is one piece of the reference biometric data where the coincidence number between the reference biometric data and the biometric data of the user is greater than or equal to the first threshold value, the processing transfers to S211. On the other hand, when there is no piece of the reference biometric data where the coincidence number between the reference biometric data and the biometric data of the user is greater than or equal to the first threshold value, the processing transfers to S204. Since the processing in S204 is the same as the above-mentioned processing, the description thereof will be omitted.

In S211, the CPU 202 transmits information indicating an authentication success, to the biometric authentication device 100 through the network interface device 218, and notifies the user of the authentication success. The processing transfers to S212.

In S212, by referring to the similar region data corresponding to the reference biometric data judged to correspond to the individual, the CPU 202 judges whether or not the reference biometric data is to be updated. When the reference biometric data is to be updated, the processing transfers to S213. On the other hand, when the reference biometric data is not to be updated, the processing is terminated.

In S213, on the basis of the similar region data corresponding to the reference biometric data judged to correspond to the individual, the CPU 202 adds the information of the input biometric data to the reference biometric data, thereby updating the reference biometric data. The processing transfers to S214.

In S214, the CPU 202 stores the reference biometric data updated in S213, in the external storage device 114. The processing is terminated.

As above, according to the second embodiment, the server authentication device in the biometric authentication system performs authentication by weighting regions similar to other reference biometric data. Therefore, even if the biometric data of the user turns out to be similar to the reference biometric data of another user, it is possible to perform biometric authentication with emphasis on dissimilar regions.

Therefore, according to the second embodiment, in the 1:N authentication method, it is possible to provide a biometric authentication system capable of maintaining an authentication success rate high.

While, as above, the biometric authentication device and the biometric authentication system according to the exemplified embodiments of the present art have been described, the present art is not limited to the specifically disclosed embodiments, and various modifications and alterations may occur insofar as they are within the scope of the appended claims.

According to one aspect of the technique in the present disclosure, it is possible to effectively perform individual authentication.

As mentioned above, the present invention has been specifically described for better understanding of the embodiments thereof and the above description does not limit other aspects of the invention. Therefore, the present invention can be altered and modified in a variety of ways without departing from the gist and scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A biometric authentication device comprising:
a memory; and
a processor coupled to the memory and configured to execute a process including:
comparing acquired biometric data with a plurality of pieces of reference biometric data;
when a match occurs between the acquired biometric data and at least two of the plurality of pieces of reference biometric data, determining whether corresponding regions in the at least two of the plurality of pieces of reference biometric data are similar to each other, the at least two of the plurality of pieces of reference biometric data being divided into regions;
weighting similar regions among the corresponding regions, with a first weighting and weighting dissimilar regions of the at least two pieces of reference biometric data with a second weighting which is different from the first weighting; and
judging a degree of similarity between the acquired biometric data and the weighted pieces of reference biometric data, based on the weighted similar regions and the weighted dissimilar regions.

2. The biometric authentication device according to claim 1, wherein the process includes:
calculating a first value, based on a sum of a second value based on characteristic points in the dissimilar regions and a third value obtained by multiplying characteristic points in the similar regions by a value less than one, with respect to the at least two pieces of reference biometric data, and performing the judging on the basis of the calculated first value.

3. The biometric authentication device according to claim 1, wherein the process includes
updating the pieces of the reference biometric data including the similar regions based on the similar regions.

4. The biometric authentication device according to claim 2, wherein the process includes:
replacing a corresponding region of a reference biometric data where the calculated first value exceeds a first threshold value with the dissimilar region.

5. A method of controlling a biometric authentication device comprising:
comparing acquired biometric data with a plurality of pieces of reference biometric data;
when a match occurs between the acquired biometric data and at least two of the plurality of pieces of reference biometric data, determining whether corresponding regions in the at least two of the plurality of pieces of reference biometric data are similar to each other, the at least two of the plurality of pieces of reference biometric data being divided into regions;
weighting similar regions among the corresponding regions with a first weighting and weighting dissimilar regions of the at least two pieces of reference biometric data with a second weighting which is different from the first weighting; and
judging a degree of similarity between the acquired biometric data and the weighted pieces of reference biometric data based on the weighted similar regions and the weighted dissimilar regions.

6. The method of controlling the biometric authentication device according to claim 5, wherein the method includes:
calculating a first value, based on a sum of a second value based on characteristic points in the dissimilar regions and a third value obtained by multiplying characteristic points in the similar regions by a value less than one, with respect to the at least two pieces of reference biometric data, and performing the judging on the basis of the calculated first value.

7. The method of controlling the biometric authentication device according to claim 6, wherein the method includes:
updating the pieces of the reference biometric data, including the similar regions based on the similar regions.

8. The method of controlling the biometric authentication device according to claim 7, wherein the method includes:
replacing a corresponding region of a reference biometric data where the calculated first value exceeds a first threshold value with a region corresponding to the dissimilar region.

9. A non-transitory, computer readable storage medium storing a program for controlling a biometric authentication device, according to a process comprising:
comparing acquired biometric data with a plurality of pieces of reference biometric data;
when a match occurs between the acquired biometric data and at least two of the plurality of pieces of reference biometric data, determining whether corresponding regions in the at least two of the plurality of pieces of reference biometric data are similar to each other, the at least of the two plurality of pieces of reference biometric data being divided into regions;

weighting similar regions among the corresponding regions with a first weighting and weighting dissimilar regions of the at least two pieces of reference biometric data with a second weighting which is different from the first weighting; and judging a degree of similarity between the acquired biometric data and the weighted pieces of reference biometric data, based on the weighted similar regions and the weighted dissimilar regions.

10. The non-transitory, computer readable storage medium according to claim 9, wherein the process includes:

calculating a first value, based on a sum of a second value based on characteristic points in the dissimilar regions and a third value obtained by multiplying characteristic points in the similar regions by a value less than one, with respect to the at least two pieces of reference biometric data, and performing the judging on the basis of the calculated first value.

11. The non-transitory, computer readable storage medium according to claim 10, wherein the process includes:

updating the pieces of the reference biometric data, including the similar regions based on the similar regions.

12. The non-transitory, computer readable storage medium according to claim 11, wherein the process includes:

replacing a corresponding region of a reference biometric data where the calculated first value exceeds a first threshold value with the dissimilar region.

13. The biometric authentication device of claim 1, wherein the second weighting is greater than the first weighting.

14. The biometric authentication device according to claim 13, wherein the first weighting is a first coefficient and the second weighting is a second coefficient.

15. The biometric authentication device according to claim 1, wherein the plural pieces of reference biometric data comprise reference fingerprints and wherein the acquired biometric data is a fingerprint to be compared with the reference fingerprints.

16. The biometric authentication device according to claim 1, wherein the similar regions are determined in response to an acquisition of the acquired biometric data.

17. The biometric authentication device according to claim 1, wherein the process includes:

updating the pieces of reference biometric data based on at least the one of the similar regions and dissimilar regions.

18. The biometric authentication device according to claim 1, wherein the process includes:

extracting the at least two pieces of reference biometric data from a plurality of reference biometric data that have been stored, based on a first comparing of the acquired biometric data with the plurality of reference biometric data.

19. The biometric authentication device according to claim 1, wherein the process includes:

determining one of the pieces of reference biometric data that matches the acquired biometric data based on the judging;

extracting a dissimilar portion in the determined reference biometric data; and updating the determined reference biometric data by the weighted dissimilar portion in the determined one of the pieces of reference biometric data.

20. The biometric authentication device according to claim 1, wherein at least one of the first weighting and the second weighting is zero.

* * * * *

UNITED STATES PATENT AND TRADEMARK OFFICE
CERTIFICATE OF CORRECTION

PATENT NO. : 8,792,686 B2  
APPLICATION NO. : 13/310133  
DATED : July 29, 2014  
INVENTOR(S) : Kazuya Uno et al.

Page 1 of 1

It is certified that error appears in the above-identified patent and that said Letters Patent is hereby corrected as shown below:

In the Claims

Column 14, Line 58, In Claim 8, after "with" delete "a region corresponding to".

Column 15, Line 3, In Claim 9, delete "of the two" and insert -- two of the --, therefor.

Signed and Sealed this  
Twenty-eighth Day of October, 2014

Michelle K. Lee  
*Deputy Director of the United States Patent and Trademark Office*